United States Patent [19]
Kroemer et al.

[11] Patent Number: 5,671,190
[45] Date of Patent: Sep. 23, 1997

[54] METHOD AND DEVICE FOR MEASURING THE DISTANCE OF AN OBJECT FROM AN ULTRASONIC TRANSMISSION/RECEPTION UNIT

[75] Inventors: Nils Kroemer, Hohenstein-Ernstthal; Martin Vossiek, München, both of Germany

[73] Assignee: Siemens Aktiengesellschaft, Munich, Germany

[21] Appl. No.: 571,856

[22] PCT Filed: Jun. 15, 1994

[86] PCT No.: PCT/DE94/00670

§ 371 Date: Dec. 18, 1995

§ 102(e) Date: Dec. 18, 1995

[87] PCT Pub. No.: WO95/00862

PCT Pub. Date: Jan. 5, 1995

[30] Foreign Application Priority Data

Jun. 22, 1993 [DE] Germany .................. 43 20 698.0

[51] Int. Cl.⁶ .................................................. G01S 15/08
[52] U.S. Cl. .................................................. 367/99
[58] Field of Search ................................. 367/99, 87

[56] References Cited

U.S. PATENT DOCUMENTS 3,683,324  8/1972  Hoxsie .................. 367/114
4,580,251  4/1986  Koukovinis ........... 367/151
4,675,854  6/1987  Lau ......................... 367/99

FOREIGN PATENT DOCUMENTS 0 283 599   9/1988  European Pat. Off. .
42 04 414   6/1993  Germany .

OTHER PUBLICATIONS

"Signal Processing For Smart Ultrasonic Sensors," Magori, Proc. 3rd Annual European Computer Conf., Hamburg, Germany, May 1989, pp. 3–21 to 3–26.

*Primary Examiner*—Daniel T. Pihulic
*Attorney, Agent, or Firm*—Hill, Steadman & Simpson

[57] ABSTRACT

The method makes it possible, in particular, to measure distances which lie within the ambiguity zone of the ultrasonic transmission/reception unit. The ultrasonic transmission/reception unit comprises a single ultrasonic transducer which is operated in pulse-echo mode. The time $t_{e1}$ of the first received echo is initially determined. If this time lies outside the double dead time $2t_T$, then the measurement is unambiguous and the propagation time of the sound, which is proportional to the difference between the ultrasonic transmission/reception unit and the object, is output. Otherwise, the propagation time of the sound is determined from the difference between the arrival times of two successive multiple echoes from the same object.

10 Claims, 6 Drawing Sheets

TRANSMISSION/
RECEPTION
UNIT

METHOD AND DEVICE FOR MEASURING THE DISTANCE OF AN OBJECT FROM AN ULTRASONIC TRANSMISSION/RECEPTION UNIT

BACKGROUND OF THE INVENTION

1. Field of the Invention

The invention relates to a method and a device for distance measurement which are suitable for ultrasonic distance sensors which work on the basis of single-transducer arrangements in pulse-echo operation. The invention is advantageously usable for the purposes of contactless distance measurement, position determination of objects and filling-level measurement, with a wide dynamic measurement range.

2. Description of the Prior Art

Ultrasonic distance sensors which work according to the pulse-echo method, transmit a sonic signal and receive in the form of an echo the signal reflected from the object. The propagation time of the acoustic signal transmitted by the sonic transmitter until arrival at the sonic receiver gives a measure of the absolute path distance, by which is meant the path distance from the sonic transmitter to the object and back. A single sonic transducer is frequently used for alternate transmission and reception. However, the reflected sonic signal cannot be received until the transmission process has decayed sufficiently. For this reason, ultrasonic sensors which operate with a single transducer always have an ambiguity zone, the extent of which depends both on the properties of the transducer and on the excitation function. This intrinsic ambiguity zone is disadvantageous for many practical applications since, on the one hand, the measurement range is restricted to the extent that echo signals whose propagation time is less than the time corresponding to the ambiguity zone can no longer be detected and, on the other hand, in the case of detected echoes, it is no longer possible to establish whether the first echo actually detected is the primary echo or an echo produced by multiple reflection, a so-called multiple echo. This can lead to large measurement errors if a predetermined minimum distance between the ultrasonic distance sensor and the object of the measurement is not reached.

Methods and circuit arrangements by which it is intended to minimize the ambiguity zone of the transducer are known. As described in German OS 33 39 984 and in U.S. Pat. No. 3,683,324, the solution to the problem consists in using a controllable amplifier to reduce the amplitude of the decaying crosstalk signal after the transmission process to such an extent that a particular threshold value is not exceeded. Short-range echoes which are above this threshold value can, however, be detected.

Another solution consists in shortening the reverberation time by exciting the transducer after the transmission process with phase-inverted pulses, and thereby retarding the transducer. Time-optimized short echo signals are obtained by exciting the sonic transducer with the temporal signal corresponding to the inverse transducer transfer function, for example according to Magori, V.: Signal processing for smart ultrasonic sensors. Proc. 3rd Annual European Computer Conference, Hamburg, May 1989, pp 3–21 to 3–26. Because of the comparatively long temporal extent of the inverse excitation signal, the ambiguity zone of the sensor is not, however, substantially reduced in this case.

For measurement tasks dealing primarily with small distances, very wide-band ultrasonic transducers are preferably used, which are inherently distinguished by very short reverberation times.

The known solutions for shortening the ambiguity zone remain adversely affected by the disadvantage that echoes within these ambiguity zones are not detectable, and spurious measurements can therefore be triggered.

Ultrasonic distance sensors with a single transducer are known, in which the transducer is arranged in the sensor head in such a way that the ambiguity zone of the transducer is compensated for by an adapted sound delay path within the sensor head, as described in DE 83 32 005. In this way, spurious measurements as a result of ambiguous echoes are prevented, since the object of the measurement cannot be closer than a minimum distance from the transducer. The delay path may in this case be straight angled. The intrinsic increase in the overall shape of the sensor head is in any case a disadvantage.

Methods are further known for plausibility testing of the measurement results of distance sensors which suppress spurious measurements on the basis of the temporal development of the echo. However, these methods cannot be applied if the sensor is turned off and the situation changes in the meantime, which is frequently the case in practice.

Ultrasonic distance sensors which have separate transducers for transmission and reception are also known. Disadvantages in this case are, however, the increased expenditure, the enlargement of the overall shape and, above all at short range, the occurrence of parallax errors as a result of the different positions of the transducers.

A common factor in the case of these solutions is that either the distance between the sonic transducer and the reflector must not be less than a fixed value, in order to avoid spurious measurements, or else there need to be separate transducers for transmission and reception.

SUMMARY OF THE INVENTION

An object of the invention is to provide a method and a device for distance measurement by means of ultrasound, in particular for measuring distances which lie within the ambiguity zone of the ultrasonic transmission/reception unit. An advantage of the invention is that it is possible to recognize and accordingly deal with spurious measurements.

In order to achieve the object, assessment of the temporal position of the first detected echo is initially to be employed, because the temporal position can give information regarding the unambiguity of the measuring signal. If the time $t_{e1}$ when a first detected echo arrives lies outside the double dead time $2t_T$ of the device (the device is also referred to below as the sensor) then no previous echo from the same object can have appeared within the dead time $t_T$. The measured distance can be assigned unambiguously to the object. If the time $t_{e1}$ when the first echo arrives lies within the double dead time $2t_T$ of the sensor, then unambiguous assignment of the propagation time between the object and the ultrasonic transmission/reception unit is no longer possible. For this reason it is expedient to determine at least the time $t_{e2}$ at which a subsequent multiple echo from the same object arrives. The relevant propagation time $t_L$ from the ultrasonic transmission/reception unit to the object of the measurement and back is then given by the difference between the times $t_{e2}$ and $t_{e1}$.

DESCRIPTION OF THE PREFERRED EMBODIMENTS

Figure 1A:
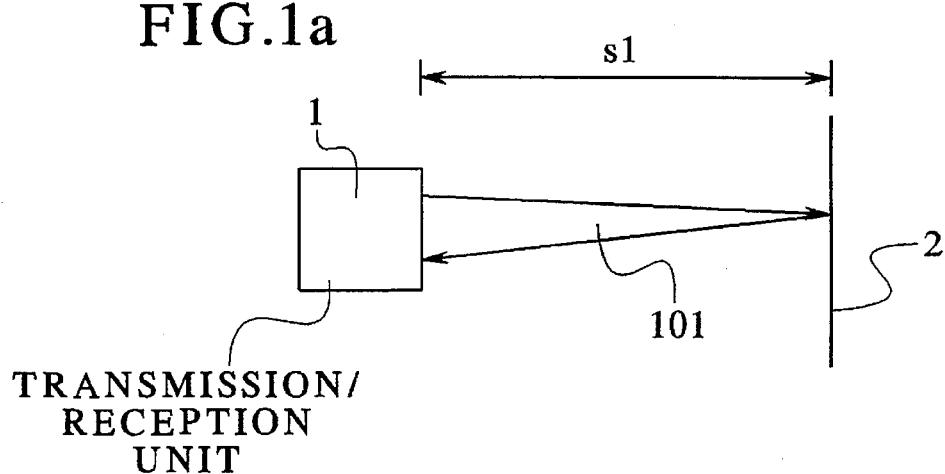
FIG. 1a shows a measurement situation.
Figure 1B:
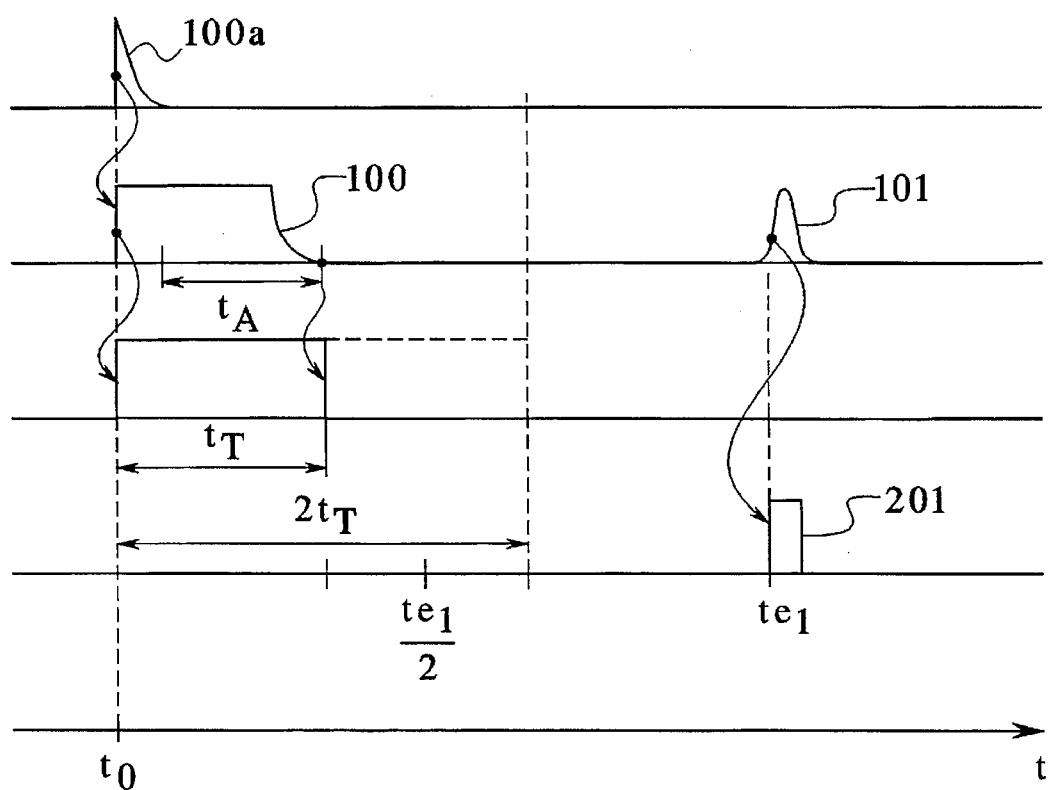
FIG. 1b shows the signal profiles corresponding thereto, for an echo from the object of the measurement arriving outside the double dead time $2t_T$.

In the case of the measurement situation represented in FIG. 1a, the object 2 of the measurement is at a distance s1 from the ultrasonic transmission/reception unit 1. As shown in FIG. 1b, the distance s1 is in this case large enough for the reflected signal 101 of the transmitted pulse 100 to lie outside the double ambiguity zone of the ultrasonic transmission/reception unit 1. The ambiguity zone is generally given by the double dead time $2t_T$. The sonic signal 101 (also referred to as the echo) is produced by the transmitted pulse 100a and, after reflection from the object 2 of the measurement, returns to the ultrasonic transmission/reception unit 1. In FIG. 1b, the sonic signal 101 is in this case represented as a demodulated envelope curve. The echo 101 is converted into a pulse 201 whose leading edge characterizes the time $t_{e1}$ at which the echo 101 is received. During the transmission process and the recovery time $t_A$ of the sonic transducer, reception of the echo is blocked by the crosstalk signal 100. The dead time $t_T$ of the sensor is given by the sum of the excitation period and the recovery time $t_A$ of the ultrasonic transmission/reception unit. Since, in FIG. 1, the time difference $t_{e1}-t_o$ ($t_o$ is the reference time) is more than the double dead time $2t_T$, no previous echo can have been "swallowed" within the dead time $t_T$. The first echo would otherwise have appeared at $t_{e1}/2$. Since, however, echo signals are detected after the dead time $t_T$ has elapsed, and $t_{e1}/2$ is more than $t_T$, this first echo would necessarily have been received. The measurement therefore delivers an unambiguous result. The propagation time $t_L$ of the echo 101, which is proportional to the absolute path distance between the ultrasonic transmission/reception unit 1 and the object 2 of the measurement, is given by:

$$t_L = t_{e1} - t_o.$$

Figure 2A:
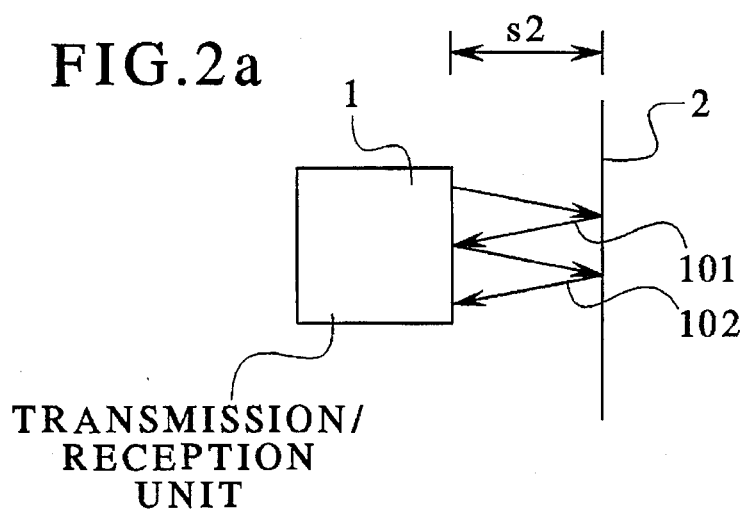
FIG. 2a shows a measurement situation.
Figure 2B:
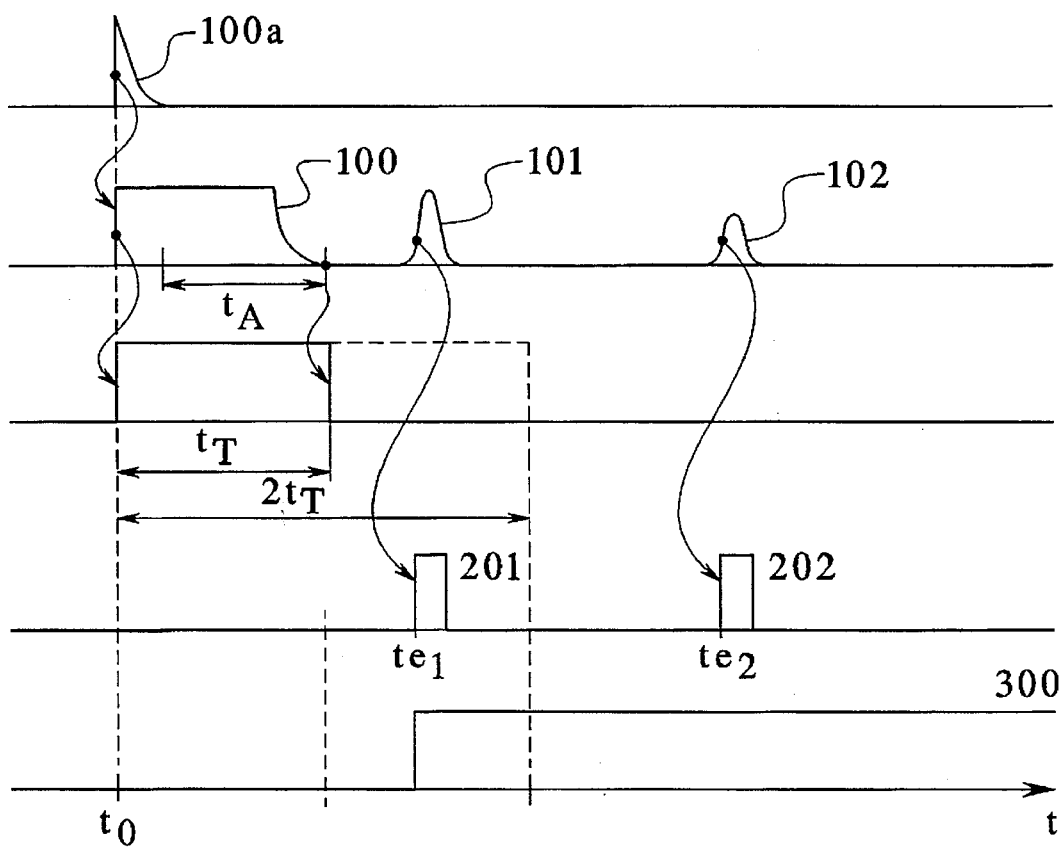
FIG. 2b shows the signal profiles associated therewith, the first echo lying between the single dead time $t_T$ and the double dead time $2t_T$ of the ultrasonic transmission/reception unit.

In the case of the measurement situation shown in FIG. 2a, the object 2 of the measurement is at a distance s2 from the ultrasonic transmission/reception unit 1. As shown in FIG. 2b, the distance s2 is so small that the propagation time of the first echo 101 is less than the double dead time $2t_T$. Two echoes 101 and 102 are now received within the represented time period. The echo 101 represents the primary echo. The echo 102 is produced by multiple reflection. Both echoes 101 and 102 are converted into the pulses 201 and 202, respectively, their leading edges respectively characterizing the times $t_{e1}$ and $t_{e2}$ at which the echoes 101 and 102 are respectively received. Because the time $t_{e1}$ of arrival of the first echo 101 lies within the double dead time $2t_T$, a sensor control signal 300 is generated, which can be used either for activating an error message or for enabling the detection of further echoes, for example the echo 102. In the case of the detection of the further echo 102, the propagation time $t_L$ of sound from the ultrasonic transmission/reception unit 1 to the object 2 of the measurement and back is determined from the difference between the times of appearance of the two echoes 101 and 102.

In the represented case:

$$t_{e2}-t_{e1}=t_{e1}-t_o=t_L.$$

In general, in the case of the detection of further echoes, the time difference between two successive echoes can be calculated in order to determine the propagation time $t_L$ of sound from the ultrasonic transmission/reception unit 1 to the object 2 of the measurement and back.

Figure 3A:
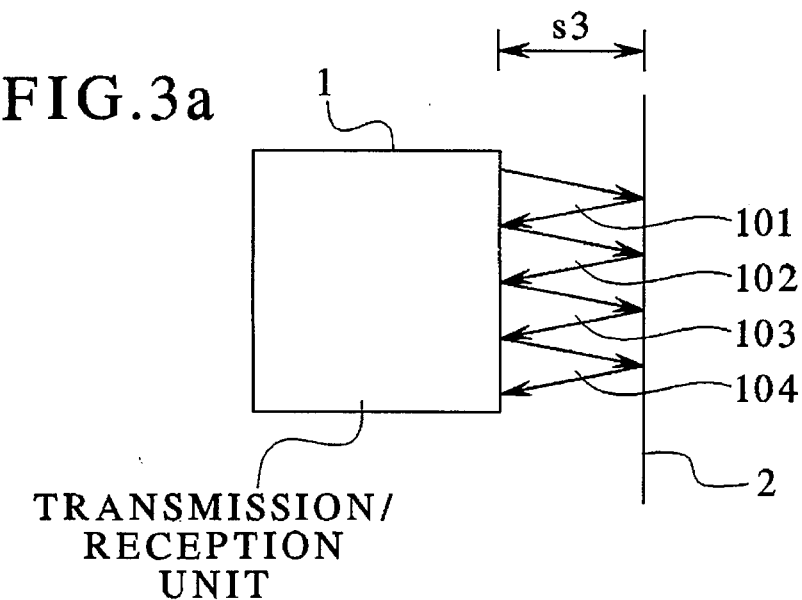
FIG. 3a shows a measurement situation.
Figure 3B:
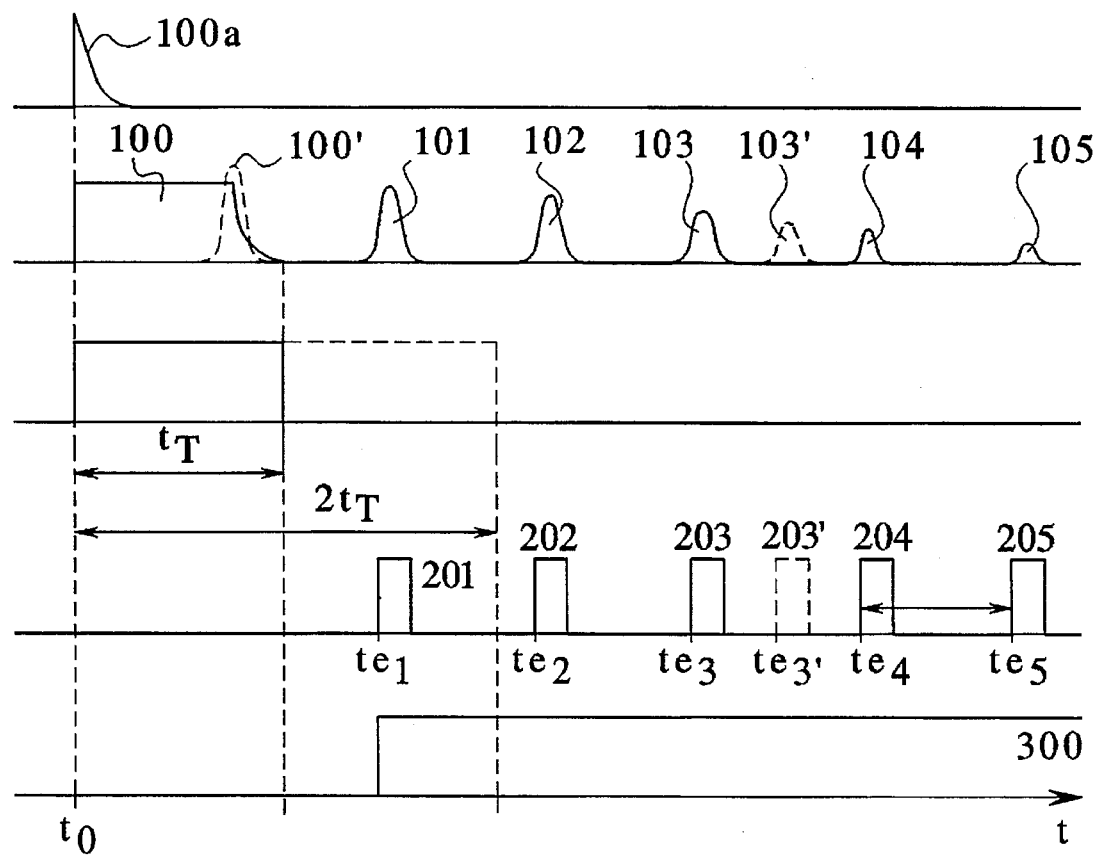
FIG. 3b shows the signal profiles corresponding thereto, a plurality of echoes arriving during the double dead time $2t_T$.

In the case of the situation represented in FIG. 3a, the object 2 of the measurement is at a distance s3 from the ultrasonic transmission/reception unit 1. As shown in FIG. 3b, the effect of the small distance s3, which is shorter than the distance s2, is that the first echo 100 arrives at the ultrasonic transmission/reception unit 1 before the dead time $t_T$ has yet elapsed. Since no echoes can be detected during the dead time $t_T$, this echo 100' is not registered by the ultrasonic transmission/reception unit 1. Because the time difference between the time $t_{e1}$ of the first detected echo 101 and the reference time $t_o$ is less than the double dead time $2t_T$, a sensor control signal 300 is generated, which can again be used for activating an error message or for enabling the detection of further echoes, for example 102, 103, 104 and 105. The echoes are converted into the pulses 201 ... 205. In the case of the detection of further echoes, for example 102 ... 105, the time difference between two successive echoes, for example 102 and 103, can be calculated in order to determine the propagation time $t_L$ of sound from the ultrasonic transmission/reception unit 1 to the object 2 of the measurement and back. In the case represented:

$$t_L=t_{e5}-t_{e4}=t_{e4}-t_{e3}=t_{e3}-t_{e2}=t_{e2}-t_{e1}=t_{e1}-t_o$$

or in general:

$$t_L=t_{ei+1}-t_{ei}=t_{e1}-t_o.$$

$t_{e1} \ldots t_{e5}$=arrival time of the echoes 101 ... 105 i=echo index.

Because $t_{e1}$ is the time of the first detected echo, and not the time of the first echo which appears:

$$t_{e1}-t_o \approx t_L.$$

In order to increase the accuracy of the measurement, the mean can be taken from the time differences which occur:

$$t_L = 1(n-1) \cdot \sum_{i=1}^{n-1} t_{ei+1} - t_{ei}$$

n being the number of echoes detected.

The signal 103' represents a spurious signal. Consequently, when taking the time difference between two respectively successive echoes:

$t_{e3}-t_{e3} \approx t_{e4}-t_{e3} \approx t_{e2}-t_{e1}$.

These deviations may cause the output of a corresponding error message. As an alternative, however, it is possible to omit the recognized measurement error during the averaging.

If the scatter in the time differences $t_{ei+1}-t_{ei}$ is too large, then the corresponding time difference is not used for averaging.

Figure 4A:
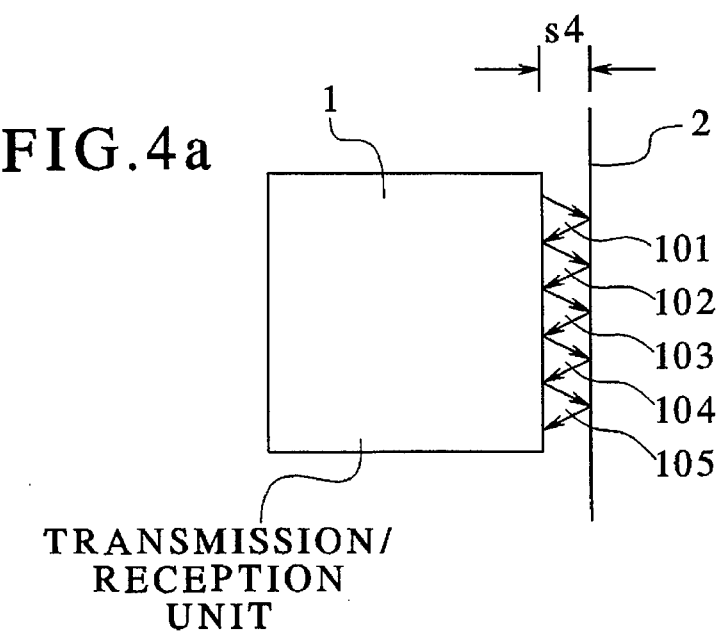
FIG. 4a shows a measurement situation.
Figure 4B:
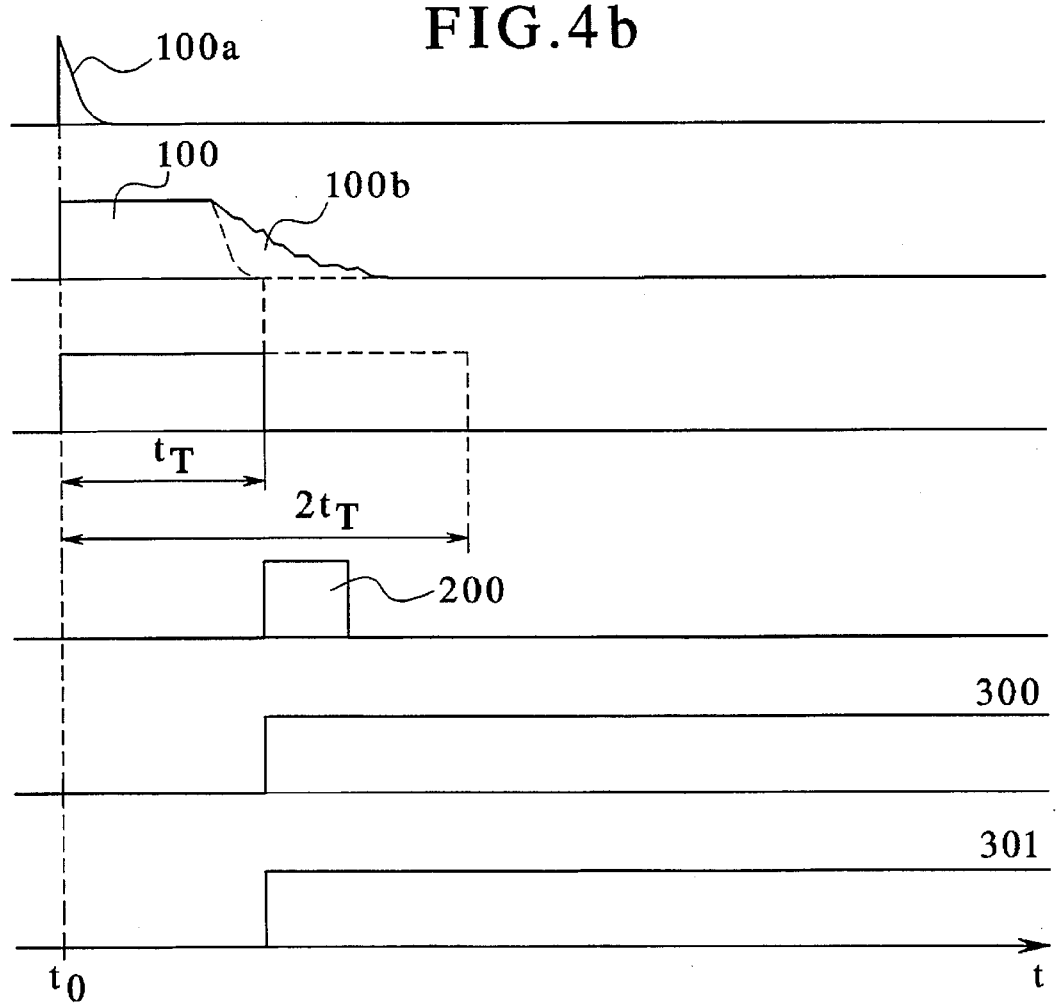
FIG. 4b shows the signal profiles associated therewith, wherein no more echoes arriving outside the dead time $t_T$.

In the case of the measurement situation shown in FIG. 4a, the distance s4 between the ultrasonic transmission/reception unit 1 and the object 2 of the measurement is so small that, as shown in FIG. 4b, the different-order echoes 101, 102 . . . 105 interfere, so that only one superposed echo signal 100b is then detected in the received signal, the individual echoes no longer being separated. Because of the position and period of the measuring signal converted into a pulse 200, an error signal 301 is generated in addition to the sensor control signal 300, this error signal indicating that the minimum measurement range of the sensor has not been reached.

Figure 5:
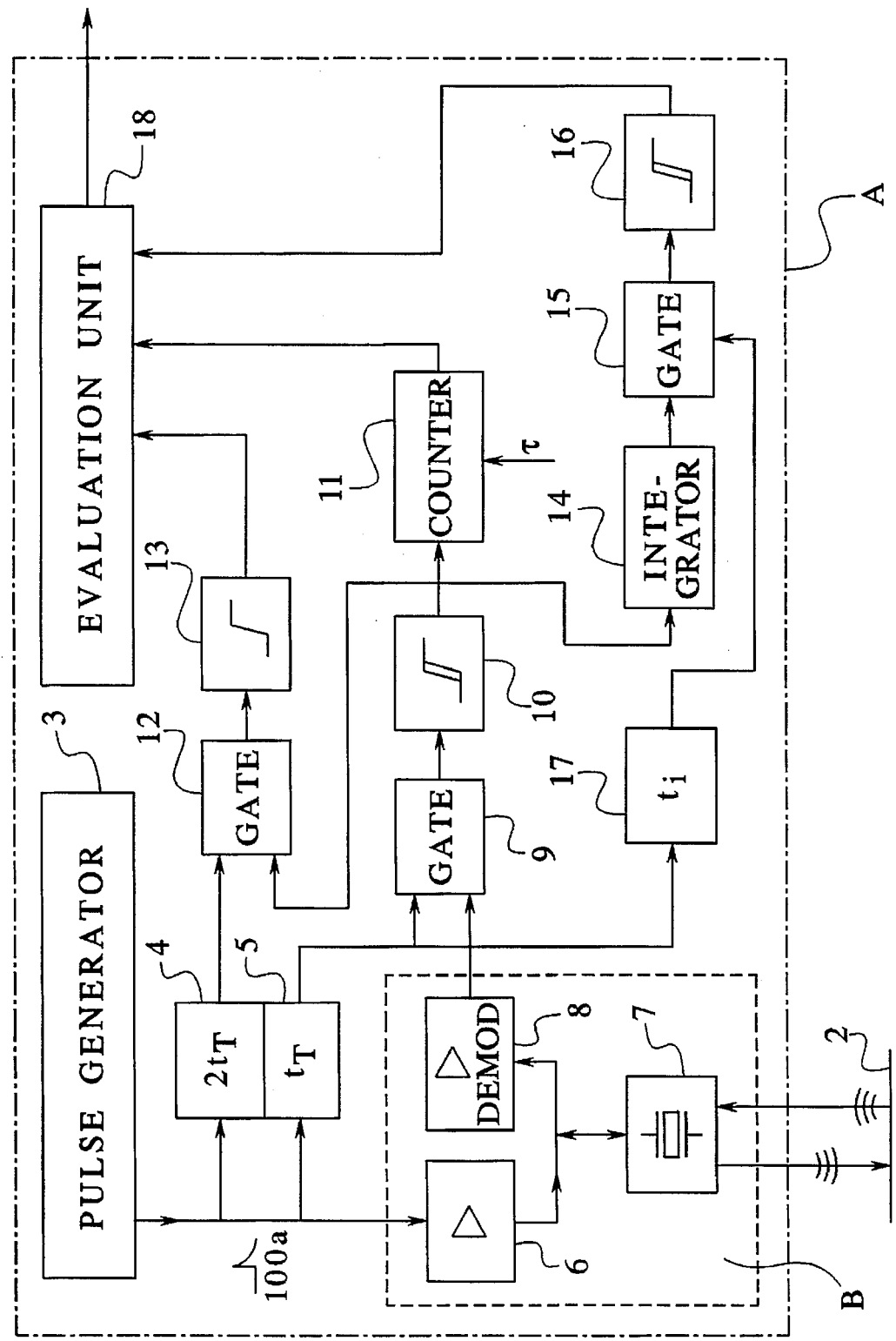
FIG. 5 shows a possible design of a device for distance measurement.

FIG. 5 shows the block diagram of a possible sensor embodiment A. A transmission pulse 100 is generated by the pulse generator 3 and sent via the transmission amplifier 6 to the ultrasonic transducer 7. The envelope curve is formed by means of the amplifier/demodulator circuit 8 from the sound signal reflected by the object 2 of the measurement. The transmission amplifier 6, the ultrasonic transducer 7 and the amplifier/demodulator circuit 8 together form the ultrasonic transmission/reception unit B. After the dead time $t_T$ of the ultrasonic transmission/reception unit B has elapsed, a gate circuit 9 is enabled by means of the time element 5, so that all echoes arriving after this dead time $t_T$ are converted into digital pulses 201, 202, . . . by the measurement comparator 10. These digital pulses 201, 202 control the counter module 11 that operates with the cycle period τ, so that the current counter state can be transferred into the evaluation unit 18 with each positive pulse edge originating from the comparator 10.

The transmission pulse 100 activates a second clock 4, which enables the gate circuit 12 for the pulses produced by the measurement comparator 10 over the period of the double dead time $2t_T$. The gate 12 is then blocked. If an echo is detected before the double dead time $2t_T$ has elapsed, then the flip-flop 13 is triggered and the sensor control signal 300 is activated.

At the end of the dead time $t_T$, given by the first clock 5, a dead-time element 17 is activated, which enables a further gate circuit 15 after the time $t_i$ has elapsed. If the recovery process is delayed, with the result that the recovery period $t_A$ and the transmission period together last longer than the dead time $t_T$ of the sensor, or the recovery time $t_A$ deviates from the set recovery time, then an integrator 14 delivers an integration value corresponding to the pulse length of the signal which is applied to the output of the measurement comparator 10. When the gate 15 is open, the integration value is converted by the downstream comparator 16 into the error signal 301.

The propagation time $t_L$ of the sound is evaluated in the evaluation unit 3 with the aid of the values transferred from the counter component 11.

Figure 6A:
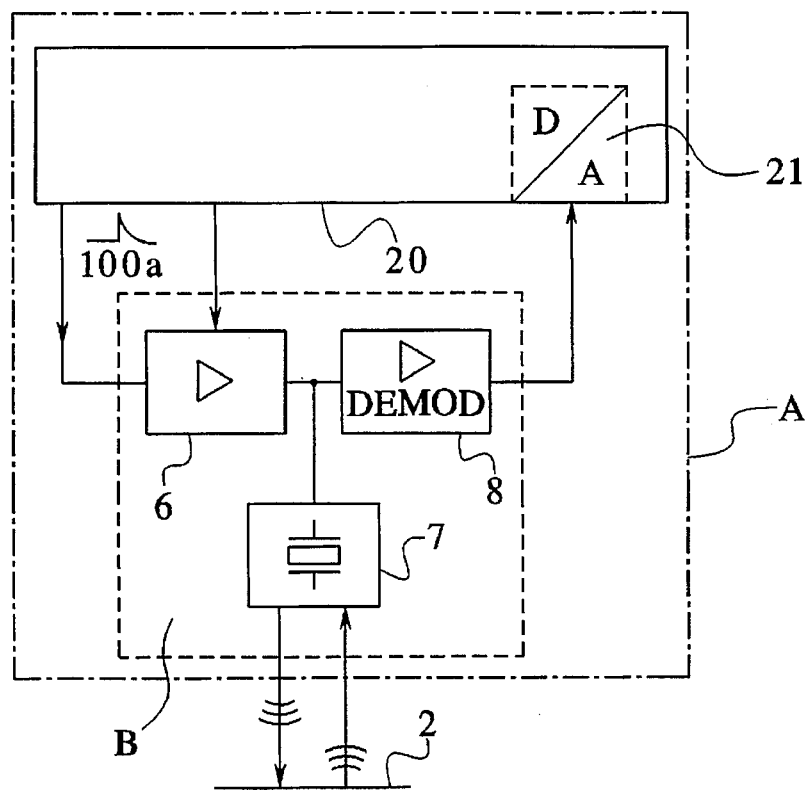
FIG. 6a shows a block diagram of a further exemplary embodiment of a device for measuring distances constructed in accordance with the invention and operating in accordance with the invention, as shown in the flowchart in FIG. 6b.
Figure 6B:
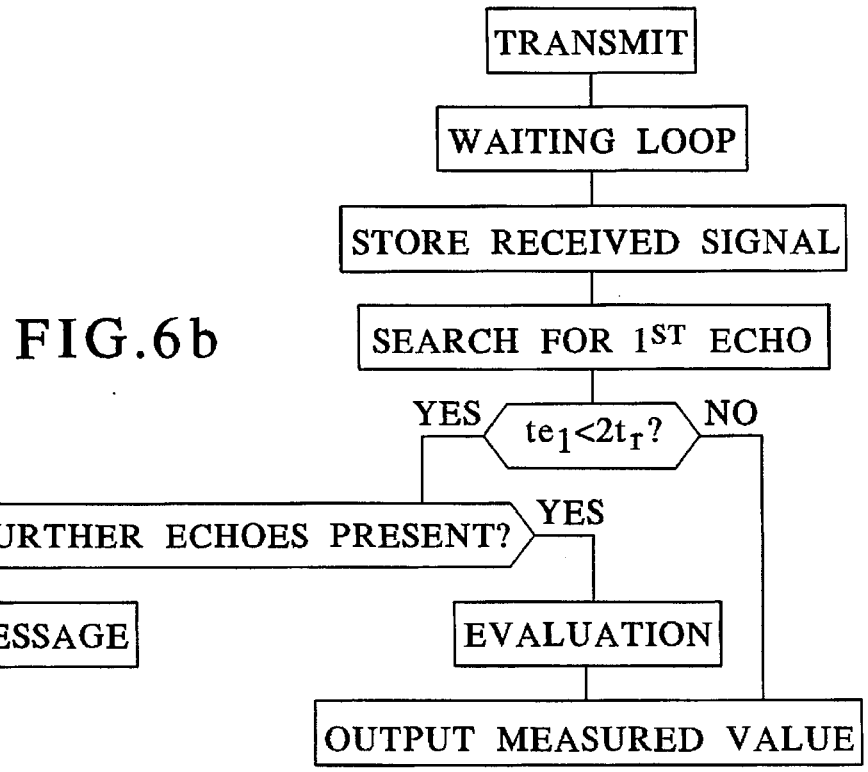

Finally, FIG. 6a shows the block diagram of a sensor A having a microcontroller 20 as control and evaluation unit. The microcontroller 20 generates a transmission pulse 100, which is sent via the amplifier 6 to the ultrasonic transducer 7. The sonic signals 101, 102, . . . reflected by the object 2 of the measurement are demodulated in the amplifier/demodulator module 8, so that the envelope curve of the echo signals 101, 102, . . . is provided at the input of the analog/digital converter unit 21 of the microcontroller 20. The detected echoes 101, 102, . . . are evaluated by means of a suitable evaluation program. FIG. 6b represents a corresponding program flow chart. At the start, an ultrasonic signal is transmitted. Because no echo can be detected during the dead time $t_T$, a waiting loop with a corresponding time period $t_T$ is executed. After the received signal has been recorded, the time $t_{e1}$ of the first echo 101 is first determined. If it lies outside the double dead time $2t_T$, then the measurement is unambiguous and the measured value can be output. Otherwise, a check is carried out as to whether further echoes are present. If further echoes are present, then the propagation time $t_L$ of the sound is determined from the difference between the arrival times of two successive echoes. In order to increase the accuracy, the mean may be taken from the differences in the arrival times of a plurality of successive echoes. If no further echoes are present, then a corresponding error message is output.

The system was tested with the example of a narrow-band 200 kHz air-ultrasound distance sensor. The system can, in particular, also be applied to filling gauges for liquids, since in this case there is, as a general rule, only a single, clearly defined object to be measured, which is in the form of the air-liquid interface. The reliability and measuring accuracy of such level sensors is considerably improved, with little expenditure, by the solution according to the invention.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for measuring the distance of an object from an ultrasonic transmission/reception unit, comprising the steps of:

emitting an ultrasound pulse from an ultrasonic transmission/reception unit toward an object whose distance from the ultrasonic transmission/reception unit is to be measured and thereby producing multiple, successive ultrasound echoes from said object;

registering a time $t_{e1}$ at which a first of said ultrasound echoes from said object is registered at said ultrasonic transmission/reception unit; and if said first of said ultrasound echoes is registered at said ultrasonic transmission/reception unit within a predetermined time interval after emission of said ultrasound pulse, registering a time $t_{e2}$ at which a second of said ultrasound echoes from said object following said first of said ultrasound echoes is received at said ultrasonic transmission/reception unit, and determining said distance of said object from said ultrasonic transmission/reception unit from a time difference $t_{e2}-t_{e1}$.

2. A method as claimed in claim 1 comprising the additional step of determining said distance from said time $t_{e1}$ if said first of said ultrasound echoes is not received at said ultrasonic transmission/reception unit within said predetermined time interval.

3. A method as claimed in claim 1 wherein said ultrasonic transmission/reception unit has a dead time, and comprising the additional step of setting said predetermined time interval proportional to said dead time.

4. A method as claimed in claim 3 wherein the step of setting said predetermined time interval to a value derived from said dead time comprises setting said predetermined time interval as twice said dead time.

5. A method as claimed in claim 1 comprising the additional steps of:

registering a plurality of further successive reception times of respective further ones of said ultrasound echoes from said object at said ultrasonic transmission/reception unit;

identifying a plurality of further time differences of each two successive reception times;

calculating an average of said plurality of further time differences; and determining said distance from said average.

6. A method as claimed in claim 5 comprising the additional steps of:

identifying any of said further time differences which deviate from each other; and omitting any of said time differences which deviate from each other in the calculation of said average.

7. A method as claimed in claim 1 comprising the additional steps of:

setting a recovery time for said ultrasonic transmission/reception unit;

monitoring whether a recovery time of said ultrasonic transmission/reception unit in operation deviates from said set recovery time; and if said recovery time of said ultrasonic transmission/reception unit deviates from said set recovery time, generating an error signal.

8. A device for distance measurement comprising:

a pulse generator which emits a pulse;

an ultrasonic transmission/reception means, supplied with said pulse, for emitting an ultrasound transmission signal directed at an object whose distance from the ultrasonic transmission/reception means is to be measured, said object producing multiple, successive ultrasound echoes by interaction with said ultrasound transmission signal and said ultrasound echoes being received by said ultrasonic transmission/reception means;

a timer, supplied with said pulse, which emits an enable signal at a predetermined time following said pulse;

gate means, having inputs respectively connected to said timer and to said ultrasonic transmission/reception means and having an output, for gating ultrasound echoes through to said output of said gate means when said enable signal is present;

a pulse former supplied with said ultrasound echoes from said gate means which forms respective echo signal pulses therefrom; and counter means, connected to said pulse former, for counting each echo signal pulse and means for determining a distance of said object from said ultrasonic transmission/reception means from a number of echo signal pulses counted by said counter means.

9. A method as claimed in claim 8 wherein said timer comprises a first timer, said enable signal comprises a first enable signal, and said predetermined time comprises a first predetermined time, and wherein said gate means comprises first gate means, said device further comprising:

a second timer, supplied with said pulse from said pulse generator simultaneously with said first timer, which emits a second enable signal starting with said pulse and ending a second a predetermined time after said pulse, said second predetermined time being twice said first predetermined time;

second gate means, having inputs respectively supplied with said second enable signal and with said echo signal pulses from said pulse former and having an output, for gating said echo signal pulses through to said output of said second gate means while said second enable signal is present; and signal generator means, connected to said output of said second gate means, for emitting a control signal if an echo pulse signal occurs during said second predetermined time.

10. A method as claimed in claim 8 wherein said timer comprises a first timer, said enable signal comprises a first enable signal, and said predetermined time comprises a first predetermined time, and wherein said gate means comprises first gate means, said device further comprising:

a second timer, supplied with said first enable signal from said first timer, which emits a second enable signal at a second predetermined time after receipt of said first enable signal;

integrator means, supplied with said echo signal pulses from said pulse former for integrating said echo signal pulses;

second gate means, having inputs respectively supplied with said second enable signal and with an output from said integrator means and having an output, for gating said output from said integrator means through to said output of said second gate means when said second enable signal is present; and means connected to said output of said second gate means for generating an error signal if said output of said integrator exceeds a predetermined amount.

\* \* \* \* \*